Jan. 23, 1945.    LE ROY M. KUBAUGH    2,367,826
RESILIENT MOUNTING
Filed Oct. 22, 1941

INVENTOR
LeRoy M. Kubaugh
BY
Elyo Frye
ATTORNEYS

Patented Jan. 23, 1945

2,367,826

UNITED STATES PATENT OFFICE 2,367,826

RESILIENT MOUNTING

Le Roy M. Kubaugh, Akron, Ohio, assignor to The Firestone Tire & Rubber Company, Akron, Ohio, a corporation of Ohio Application October 22, 1941, Serial No. 416,077

4 Claims. (Cl. 248—358)

This invention relates to resilient mountings.

A primary object of the invention is to provide improved means for connecting relatively movable members in a manner whereby resilient material such as rubber intervenes between rigid members, said material being maintained under compression to provide a pre-loaded mounting permitting substantial movement in all directions while at the same time having appreciable stability.

Another object is to provide a resilient connector for relatively movable rigid members wherein the members, while normally held in rubber insulated relation, are constrained against separation even after damage to or destruction of the intervening rubber.

A further object is to provide a vibration-dampening connector including individual resilient members for the main support and for rebound cushioning whereby to facilitate the selective assembly of devices having predetermined characteristics.

Other objects are generally to improve and simplify the construction and operation of resilient mountings for one or more of the above mentioned purposes, while still further objects will be apparent to persons skilled in the art upon an examination of the description and drawing.

In the drawing.

Like parts are identified by the same reference characters throughout the drawing and description.

Figure 1:
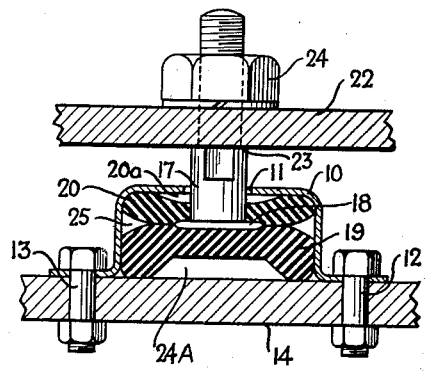
Fig. 1 is a vertical section through a resilient mounting having the invention incorporated therein.

With reference to Fig. 1, a cup-shaped housing 10, apertured at 11, is fastened by means of bolts 12 and 13 to a fixed member or base 14. A bolt 17 has a head portion 18 disposed within housing 10 intermediate a main resilient carrying support 19 and a resilient rebound washer 20. The shank portion of bolt 17 loosely projects through aperture 11 to extend upwardly from the housing 10. Bolt 17 engages the relatively movable member 22 to be supported, said member being clampingly engaged between annular shoulder 23 and lock nut 24.

Figure 2:
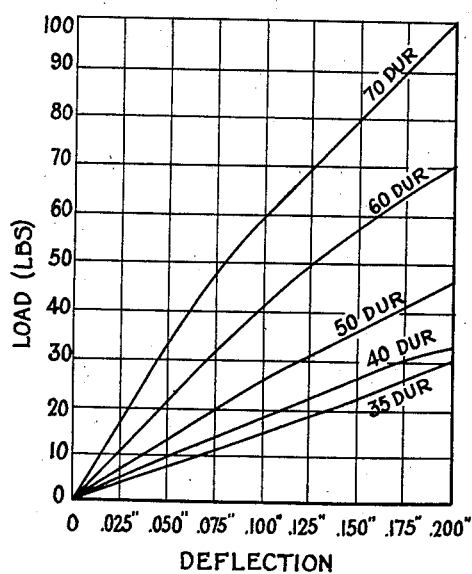
Fig. 2 shows graphically the deflection characteristics under load of the joint shown in Fig. 1 for various rubber members having Shore durometer hardness as shown.

The main resilient support 19 and the rebound washer 20 are normally of somewhat greater cross sectional area than is the interior of housing 10, whereby upon installation of the device, both the main and rebound supports are maintained under both radial and axial compression to provide a certain amount of stability between the connected members 14 and 22 while allowing relative movement therebetween under load, as illustrated in Fig. 2. Rebound washer 20 is dished to provide a void 20A below the aperture 11 to facilitate universal movement of bolt 17.

The supporting member 19 is preferably provided with a chamber 24A, opening downwardly therefrom, to provide pneumatic cushioning means intermediate members 14 and 19 to supplement the cushioning of the resilient members and to provide a space for the distortion of member 19 in a downward direction. Preferably the upper wall of member 19 is provided with a shallow channel for the reception of bolt head 18 therein. Both the main load support and the rebound member have marginally tapered inner portions to provide a channel 25 to permit expansion of marginal portions of the members.

Because member 19 absorbs the main load and member 20 absorbs the rebound, it is desirable to vary the characteristics of one or both of these members in accordance with the use for which the mounting is to be employed, and I have found that the present construction is highly desirable from an assembly standpoint because main and rebound members with varying characteristics, or combinations thereof, may be employed to produce a resilient mounting having predetermined vibration dampening properties.

Figure 3:
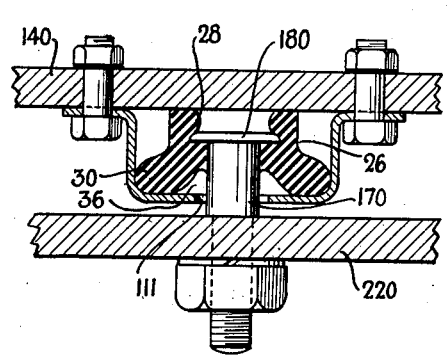
Fig. 3 illustrates in vertical section an alternative embodiment of the invention.
Figure 4:
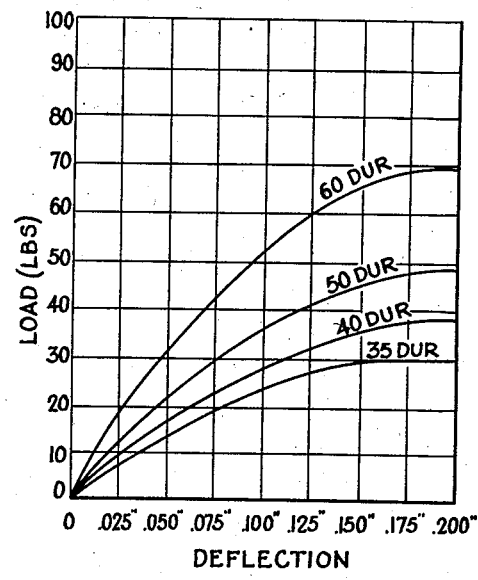
Fig. 4 is a graph that illustrates the deflection characteristics of the device of Fig. 3 under load.

An alternative embodiment of the invention is shown in Fig. 3, this type being particularly adapted for use in suspending a vibration inducing device from a supporting member, for example, for mounting a ceiling hung fan. The general construction is similar to the Fig. 1 disclosure with the exception that a single resilient member 26 is employed in place of individual main support and rebound members. Head 180 of bolt 170 is disposed within a channel having divergent walls 28 preventing removal of the head and providing rebound absorbing means. A lower flange-like portion 30 provides the main support for the load carried by bolt 170. Member 26 is confined under both axial and radial pressure for purposes above stated. Fig. 4 is a deflection chart showing characteristics of tested devices of the type shown in Fig. 3.

It will be noted that bolt head 18 of the Fig. 1 construction is normally positioned closer to the apertured wall of housing 10 than to the base member 14, whereas in the Fig. 3 construction the converse is true, thereby permitting more deflection of the bolt under main load compression than under rebound compression. The connectors above described not only allow movement in a vertical plane between members 14 and 22, as shown, but also permit universal movement therebetween within certain limits. The head 18 of bolt 17 is of larger diameter than the aperture 11 of housing 10; hence a complete failure of the resilient elements to separate the bolt from the housing will not result in complete severence of the connected parts. Member 26 is formed in the lower portion thereof with an annular groove 36 providing a void upwardly from aperture 111 to permit universal movement of bolt 170 without binding of the resilient material.

What is claimed is:

1. A resilient mounting for use between two relatively movable members, said mounting comprising a cup-shaped housing adapted for attachment to one of the members and provided at the closed end thereof with an aperture, a bolt adapted for connection to the other member and having a disk-like head portion disposed in the housing and a shank portion projecting loosely through said aperture, a main load-supporting member comprising a body of resilient material disposed within the housing in abutment with the face of said bolt head, an apertured rebound element mounted on the bolt head, said rebound element being concavo-convex in shape with its convex side adjacent said bolt head, said load-supporting member and rebound element being composed of rubber, the rubber of each having a different hardness characteristic from that of the rubber composing the other, said member and element having continguous portions outwardly from the bolt head and marginal surfaces divergent therefrom to provide an annular channel, substantially V-shaped in cross section, between said outer margins and side walls of the housing, said load-supporting member provided with a dished outer wall providing a void intermediate the member to which the housing is mounted and the load-supporting member, both said main and rebound members being maintained within the housing under both axial and radial compression whereby to provide a pre-load condition between the connected members.

2. A resilient mounting for connecting relatively movable members, said mounting comprising a housing adapted for mounting on one of the members and provided in the end wall thereof with an aperture, a bolt adapted for connection to the other member and having an enlarged head portion disposed within said housing and a shank projecting loosely through the apertured housing wall, a concavo-convex disk carried by the bolt adjacent the head thereof and disposed within the housing wtih the concave side facing toward the aperture, and a second rubber disk disposed within the housing with a portion thereof contiguous to the face of the bolt head, said disks being maintained within the housing under both axial and radial compression, the rubber composing one of said disks being more resilient than the rubber composing the other disk.

3. A vibration dampener of the class described comprising a housing having an aperture, a flat headed bolt projecting loosely through said aperture with the said head thereof disposed within th housing, a rubber support member disposed within said housing under the flat head of said bolt, said support member being provided with a chamber opening downwardly therefrom whereby space is formed into which the rubber of said support may distort when said support is under load, a rubber rebound member disposed within said housing and being removably mounted on said bolt between said head and said apertured wall, said rebound member being of substantial thickness and being concavo-convex in shape with its concave face turned toward the apertured housing wall, the rubber composing said supporting member having a different hardness characteristic from that of the rubber composing said rebound member.

4. A mounting between two relatively movable parts comprising a housing having an aperture, a bolt projecting loosely through said aperture with the head of the bolt disposed within the housing, a rubber support and a rubber rebound member mounted within said housing, said rubber members being substantially concavo-convex and being so mounted as to entirely enclose said bolt head between their convex surfaces, the rubber composing the said members having a different hardness characteristic, whereby the axial movement of said bolt meets a greater resistance in its downward movement than it does in its upward moovement.

LE ROY M. KUBAUGH.